United States Patent
Traver et al.

(10) Patent No.: US 11,385,820 B2
(45) Date of Patent: Jul. 12, 2022

(54) COMMAND BATCHING FOR A MEMORY SUB-SYSTEM

(71) Applicant: Micron Technology, Inc., Boise, ID (US)

(72) Inventors: John Paul Traver, Boise, ID (US); Yun Li, Fremont, CA (US); Scheheresade Virani, Frisco, TX (US); Ning Zhao, Milpitas, CA (US); Tom Victor Maria Geukens, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 100 days.

(21) Appl. No.: 16/809,360

(22) Filed: Mar. 4, 2020

(65) Prior Publication Data

US 2021/0278985 A1 Sep. 9, 2021

(51) Int. Cl.
*G06F 3/06* (2006.01)

(52) U.S. Cl.
CPC .......... *G06F 3/0647* (2013.01); *G06F 3/0604* (2013.01); *G06F 3/0659* (2013.01); *G06F 3/0673* (2013.01)

(58) Field of Classification Search
CPC .... G06F 3/0647; G06F 3/0673; G06F 3/0604; G06F 3/0659
See application file for complete search history.

(56) References Cited

U.S. PATENT DOCUMENTS

| | | | | |
|---|---|---|---|---|
| 6,327,615 B1 * | 12/2001 | Kasper | ................ | H04L 49/90 709/213 |
| 2006/0031643 A1 * | 2/2006 | Figueira | ................ | G06F 13/387 711/154 |
| 2014/0362858 A1 * | 12/2014 | Agarwal | ................ | H04L 49/30 370/392 |
| 2015/0046661 A1 * | 2/2015 | Gathala | ................ | G06F 9/544 711/147 |

\* cited by examiner

*Primary Examiner* — Sean D Rossiter
(74) *Attorney, Agent, or Firm* — Holland & Hart LLP

(57) ABSTRACT

Methods, systems, and devices for command batching for a memory sub-system are described. A memory sub-system can receive a plurality of commands for a plurality of transfer units of a memory sub-system and generate a list of the plurality of transfer units that includes pointers between the plurality of transfer units. The memory sub-system can store at least one pointer of the list in a shared memory that is shared by a plurality of cores, the at least one pointer indicating a next transfer unit of the list. The memory sub-system can send an indicator of a first transfer unit of the list based on storing the at least one pointer in the shared memory and retrieve the plurality of transfer units from the shared memory based on sending the indicator of the first transfer unit and storing the at least one pointer in the shared memory.

20 Claims, 4 Drawing Sheets

COMMAND BATCHING FOR A MEMORY SUB-SYSTEM

TECHNICAL FIELD

The following relates generally to a memory sub-system and more specifically to command batching for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
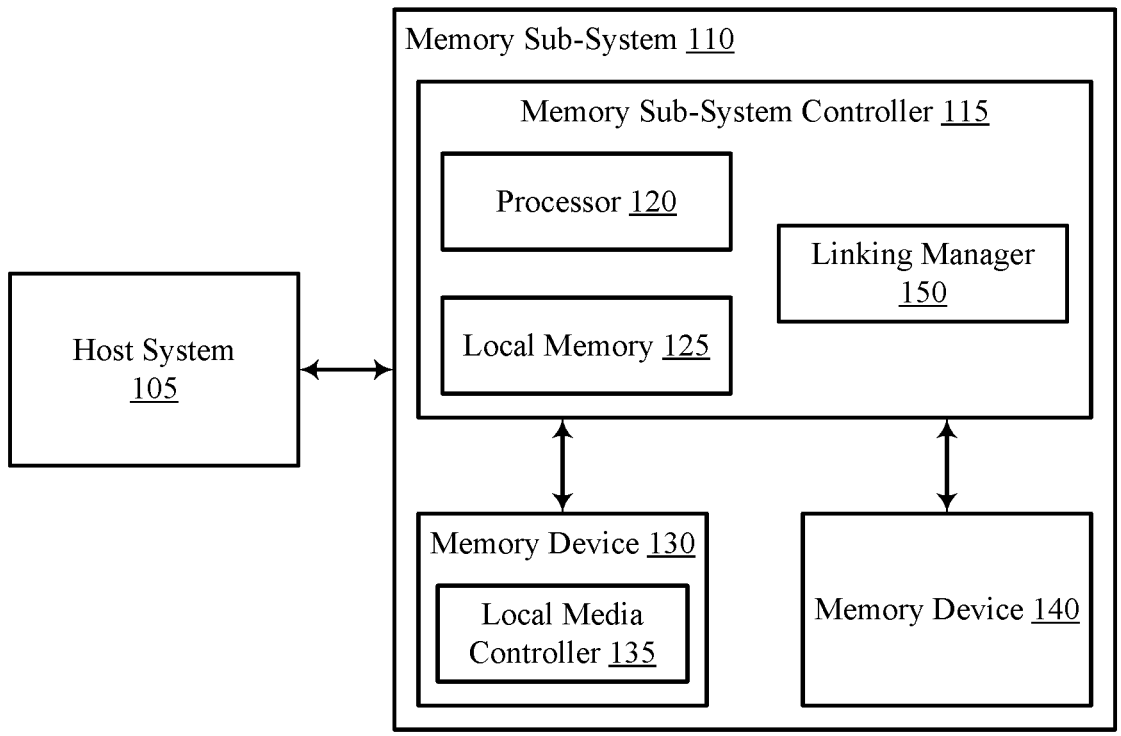
FIG. 1 illustrates an example of a computing system that includes a memory sub-system in accordance with some examples of the present disclosure.

Aspects of the present disclosure are directed to command batching for a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical transfer units, for example, blocks. Each block consists of a set of pages. Each page consists of a set of memory cells, which store bits of data.

In some memory sub-systems, each write command can be submitted one by one to a cursor of the memory sub-system in order to perform a write operation. The cursor can be included in a media translation layer and can be used to abstract the data layout and write ordering of the media. For example, the cursor can be used to ensure that data is written in the range of memory cells indicated in a command. In such cases, the cursor can receive and process each write command serially. For example, a single block of data, also referred to as a transfer unit, can be inserted into a request for the write operation. The processing core of the memory sub-system can then process a single transfer unit at a time.

If a write command is directed to a same page or multi-page boundary, receiving and processing each individual write command serially can be inefficient, which can increase the latency for future write operations to be performed on the blocks of data. Such techniques (e.g., submitting and processing write commands serially) can result in the memory device experiencing a performance loss with an increased number of individual write commands submitted and processed, which can increase the signaling overhead and/or the processing overhead for performing write operations. The memory sub-system that batches write commands can increase the overall performance of the memory sub-system as the number of write commands submitted is reduced, which can result in increased processing times related to performing the write operation.

Aspects of the present disclosure address these and other issues through the use of command batching for memory devices. For example, a list can be generated for transfer units such that the list includes pointers between each of the transfer units. In such cases, the list can be an example of a linked list. The pointers and transfer units of the linked list can be stored in a shared memory. Rather than sending each individual transfer unit as described with reference to some memory sub-systems, the memory sub-system can send an indicator of the first transfer unit of the linked list to a processing core. The indicator can be an example of an internal data description and control blocks that can be used to pass user data information and the data between hardware and firmware components. The transfer unit can then be retrieved from the shared memory based on the indicator that is associated with the first transfer unit of the linked list. In such cases, subsequent transfer units can be retrieved from the shared memory based on the indicator and the stored pointer that indicates the next transfer unit of the linked list.

By generating a linked list and sending an indicator that references the linked list between processing cores, the overall performance of the memory sub-system can be increased. For example, command batching can improve the overall efficiency of the memory sub-system by sending fewer messages between processing cores (e.g., sending only the first node of the linked list) and/or sending shorter messages (e.g., the indicator only). Upon receiving the indicator, the memory sub-system (e.g., the cursor of the translation layer) can retrieve information and/or pointers from a shared memory. The translation layer can be between the frontend layer which handles user data in transfer units and the backend layer. The translation layer can be an example of a media translation layer, such as, for example, a Flash Translation Layer (FTL). The cursor can be included within the translation layer and can be used to abstract the data layout and write ordering of the media. Such techniques can result in the memory sub-system experiencing improved read, write, and erase speeds and/or reduced power consumption, improved processing times, and the like.

Features of the disclosure are initially described in the context of a computing environment as described with reference to FIG. 1. Features of the disclosure are described in the context of method and block diagrams as described with reference to FIGS. 2 and 3. These and other features of the disclosure are further illustrated by and described with reference to a computer system that relates to command batching for a memory sub-system as described with reference to FIG. 4.

FIG. 1 illustrates an example computing system 100 that includes a memory sub-system 110 in accordance with some embodiments of the present disclosure. The computing environment can include a host system 105 and a memory sub-system 110. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fiber Channel, Small Computer System Interface (SCSI), Serial Attached SCSI (SAS), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize an non-volatile memory Express (NVMe) interface to access the components (e.g., memory devices 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the processor 120 (e.g., host system) can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) includes a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

A memory device can include one or more memory cells, such as NAND memory cells (e.g., NAND flash memory cells). Such memory cells can remain in a charged or uncharged state for prolonged periods of time. Whether the memory cell resides in a charged state or an uncharged state is representative of a logic value stored to the cell (e.g., a logic "0" or a logic "1"). Multiple NAND cells can be strung together, and strings can be replicated multiple times within a single block. Each column of cells can be referred to as a "string" and each row can be referred to as a "page." Multiple strings and pages of NAND cells can collectively be referred to as a "block."

Despite NAND cells being able to remain in a charged or uncharged state for a prolonged period of time, each cell can have a finite life cycle. Each time a NAND cell is written, the NAND cell is first erased. Over time, erasing a NAND cell can degrade its physical components, which results in the cell being associated with a finite number of write and erase operations.

A block of data (e.g., transfer unit) can include pages with valid data, and pages that contain no data (e.g., pages that have been previously erased but not yet written). The valid data can then be written (e.g., rewritten) to the memory device (e.g., to a different page of the memory device). In order to write the valid data to a location (e.g., a different page of the memory device), write commands are issued by the memory controller, each write command indicating a memory address (e.g., a destination memory address) to which the valid data is to be written.

The memory sub-system 110 includes a linking manager 150 that can receive commands for transfer units of the memory sub-system 110 and generate a linked list of the transfer units. The transfer units can be used by the memory device to access memory cells. In some cases, the transfer units can be a different size than the block of memory requested by the host system 105. The linked list can include one or more transfer units (e.g., nodes of the linked list) and pointers between the transfer units. In such cases, the linking manager 150 can link the transfer units to each other via the pointers. The linking manager 150 can store the pointers of the linked list in a shared memory that can be accessed by processor 120. For example, the pointers can be stored in the shared memory separate from the transfer units.

In some cases, the linking manager 150 can send an indicator of a transfer unit of the linked list to a processing core of processor 120. In such cases, the transfer units can be retrieved from the shared memory based on the indicator and retrieving the pointer that is stored in the shared memory. In such cases, the indicator sent to the processing core indicates the corresponding transfer unit of the linked list and the pointer associated with the transfer unit.

In some examples, the memory sub-system controller 115 includes at least a portion of the linking manager 150. For example, the memory sub-system controller 115 can include a processor 120 (e.g., a processing device) configured to execute instructions stored in local memory 125 for performing the operations described herein. In some examples, the linking manager 150 is part of the host system 105, an application, or an operating system.

The linking manager 150 can receive multiple transfer units at a same time or over a duration of time. In such cases, the linking manager 150 can link the multiple transfer units to each other via one or more pointers that indicate the next transfer unit in the linked list. The linking manager 150 can also receive multiple write commands at a same time or over a duration of time. The linking manager 150 can process the multiple write commands in parallel on a page or multi-page boundary. This parallel processing can reduce the amount of times the linking manager 150 can access each area of the memory sub-system (e.g., NAND), thereby improving performance and reliability. Further details with regards to the operations of the linking manager 150 are described below.

Figure 2:
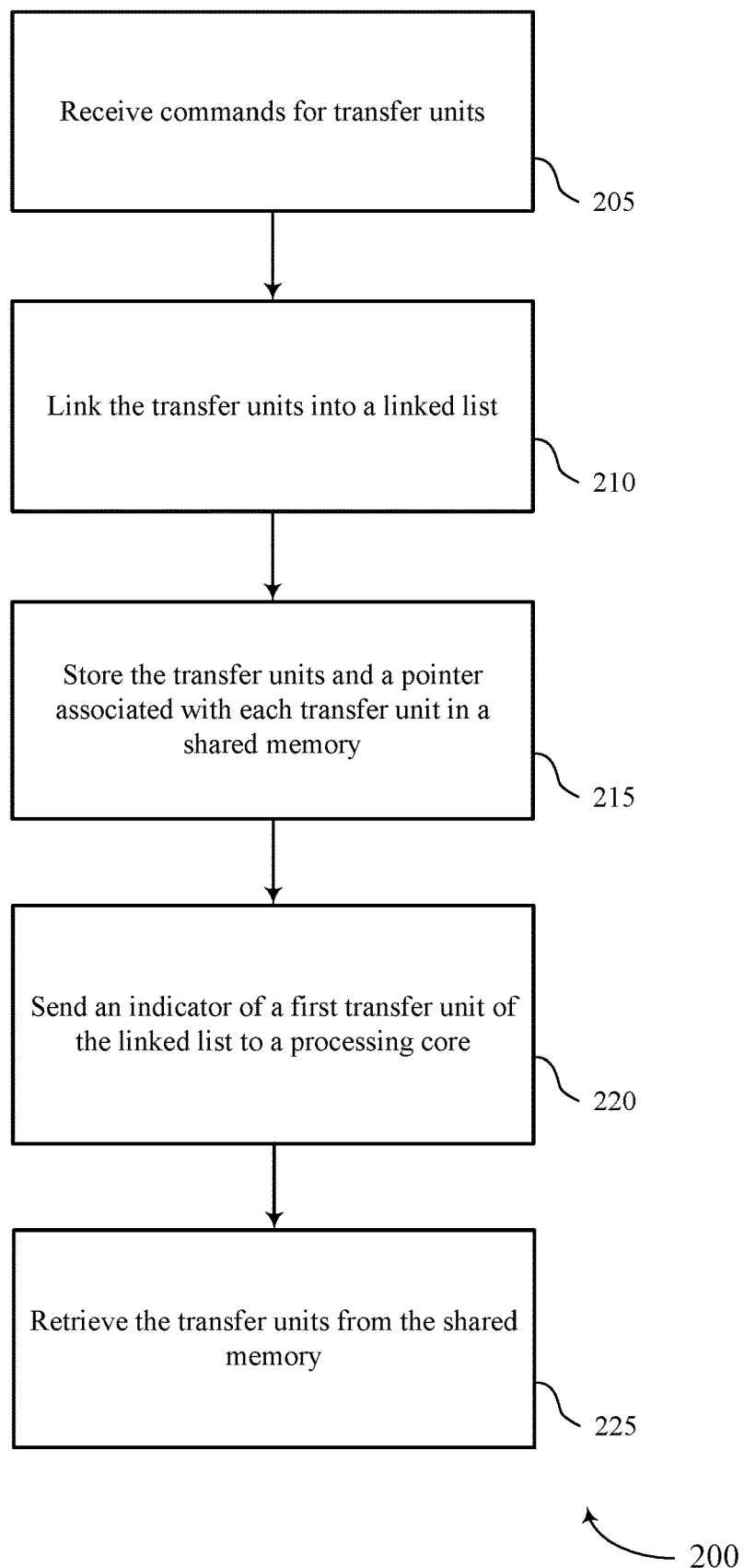
FIG. 2 is a diagram of an example method that supports command batching for a memory sub-system in accordance with some examples of the present disclosure.

FIG. 2 is a diagram of an example method 200 that supports command batching for a memory sub-system in accordance with some examples of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the linking manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

At operation 205, the processing device of a frontend manager can receive commands for transfer units. For example, the processing device can receive a plurality of commands for a plurality of transfer units of a memory sub-system. The commands can be examples of write commands. The commands can be received from a host device. In some examples, aspects of the operations of 205 can be performed by linking manager 150 as described with reference to FIG. 1.

At operation 210, the processing device can link to transfer units into a linked list. For example, the processing device of the frontend manager can generate a linked list of the plurality of transfer units that includes pointers between the plurality of transfer units. The pointers between the transfer units can indicate the next transfer unit in the linked list of transfer units. The processing device can set an order of the transfer units in the linked based on determining the next transfer units in the linked list. The next transfer unit can be determined based on an order of a write command receipt. In some cases, the next transfer unit can be determined based on determining that the write address of the next transfer unit is adjacent to a write address of the first transfer unit. In addition, the pointer associated with a first TU may point to a second TU that is the next TU in the linked list.

In some examples, the indicator can be added to at least one internal command, also referred to as a backend command or B-command. For example, the method 200 can include assigning the plurality of transfer units in the linked list to at least one B-command to write data to a memory device of the memory sub-system based on retrieving the plurality of transfer units. In some examples, processing core of the translation manager can determine that a field of the B-command is full. In such cases, the method 200 can include determining that a plurality of fields of the at least one internal command are occupied (e.g., full) based on assigning the plurality of transfer units to the at least one internal command. If the B-command is full, the translation manager can send the B-command to the backend manager. For example, the method 200 can include sending, to the memory device (e.g., a backend manager), the at least one internal command based on determining that the plurality of fields of the at least one internal command are occupied. In some examples, links between the plurality of transfer units in the linked list can be independent of a host command. In some examples, aspects of the operations of 210 can be performed by linking manager 150 as described with reference to FIG. 1.

At operation 215, the processing device can store the transfer units and a pointer associated with each transfer unit in a shared memory. The shared memory can be accessed by multiple processing cores such as input/output (I/O) core, FTL core, and a processing core of the backend manager. For example, the processing device of a translation manager (e.g., the FTL) can store at least one pointer of the linked list in a shared memory that is shared by a plurality of cores, the at least one pointer indicating a next transfer unit of the linked list. In some examples, the method 200 can include storing, in the shared memory of the memory sub-system, the plurality of transfer units based on receiving the plurality of commands. In some examples, aspects of the operations of 215 can be performed by linking manager 150 as described with reference to FIG. 1.

At operation 220, the processing device can send an indicator of a first transfer unit of the linked list to a processing core. For example, the processing core of the frontend manager can send, from an input/output core to a processing core, an indicator of a first transfer unit of the linked list based on storing the at least one pointer in the shared memory. The indicator can be associated with first transfer unit and sent to a processing core in place of sending the first transfer unit. In some examples, aspects of the operations of 220 can be performed by linking manager 150 as described with reference to FIG. 1.

At operation 225, the processing device can retrieve the transfer units from the shared memory. For example, the processing device can retrieve the plurality of transfer units from the shared memory based on sending the indicator of the first transfer unit and storing the at least one pointer in the shared memory. The processing core can receive the indicator and retrieve the transfer unit associated with the indicator. In some cases, the transfer unit can include a pointer that indicates the next transfer unit in the linked list of transfer units. The processing core can retrieve subsequent transfer units (e.g., the next transfer unit) based on the pointer associated with the first transfer unit. For example, retrieving the plurality of transfer units can include retrieving the first transfer unit from the shared memory based on sending the indicator. In some examples, retrieving the plurality of transfer units can include retrieving the at least one pointer from the shared memory based on retrieving the first transfer unit from the shared memory. In some examples, retrieving the plurality of transfer units can include retrieving the next transfer unit from the shared memory based on retrieving the at least one pointer.

In some cases, the processing core can retrieve a second pointer associated with a second next transfer unit. The second pointer can indicate the second next transfer unit in the linked list of transfer units. The method 200 can include retrieving a second pointer from the shared memory based on retrieving the next transfer unit from the shared memory and identifying a second next transfer unit based on the second pointer. In some cases, the second next transfer unit can be after the first transfer unit in the linked list. The second next transfer unit can be linked to the second pointer based on an order of a write command receipt, a write address of the second next transfer unit, or both. In some examples, the method 200 can include identifying that a second pointer associated with a second transfer unit of the plurality of transfer units is stored in the shared memory based on retrieving the transfer unit from the shared memory. In some examples, the method 200 can include retrieving, from the shared memory, the second transfer unit based on identifying that the second pointer is stored in the shared memory. In some examples, the processing core of the translation manager can receive a single call for several transfer units to be included in the link list.

In such cases, retrieving the plurality of transfer units can be based on sending a single indicator of the first transfer unit of the plurality of transfer units. In some examples, the indicator comprises the single indicator. In some examples, the processing device can perform a write process to write the plurality of transfer units to a memory device of the memory sub-system based on retrieving the plurality of transfer units from the shared memory. In some examples, aspects of the operations of 225 can be performed by linking manager 150 as described with reference to FIG. 1.

Figure 3:
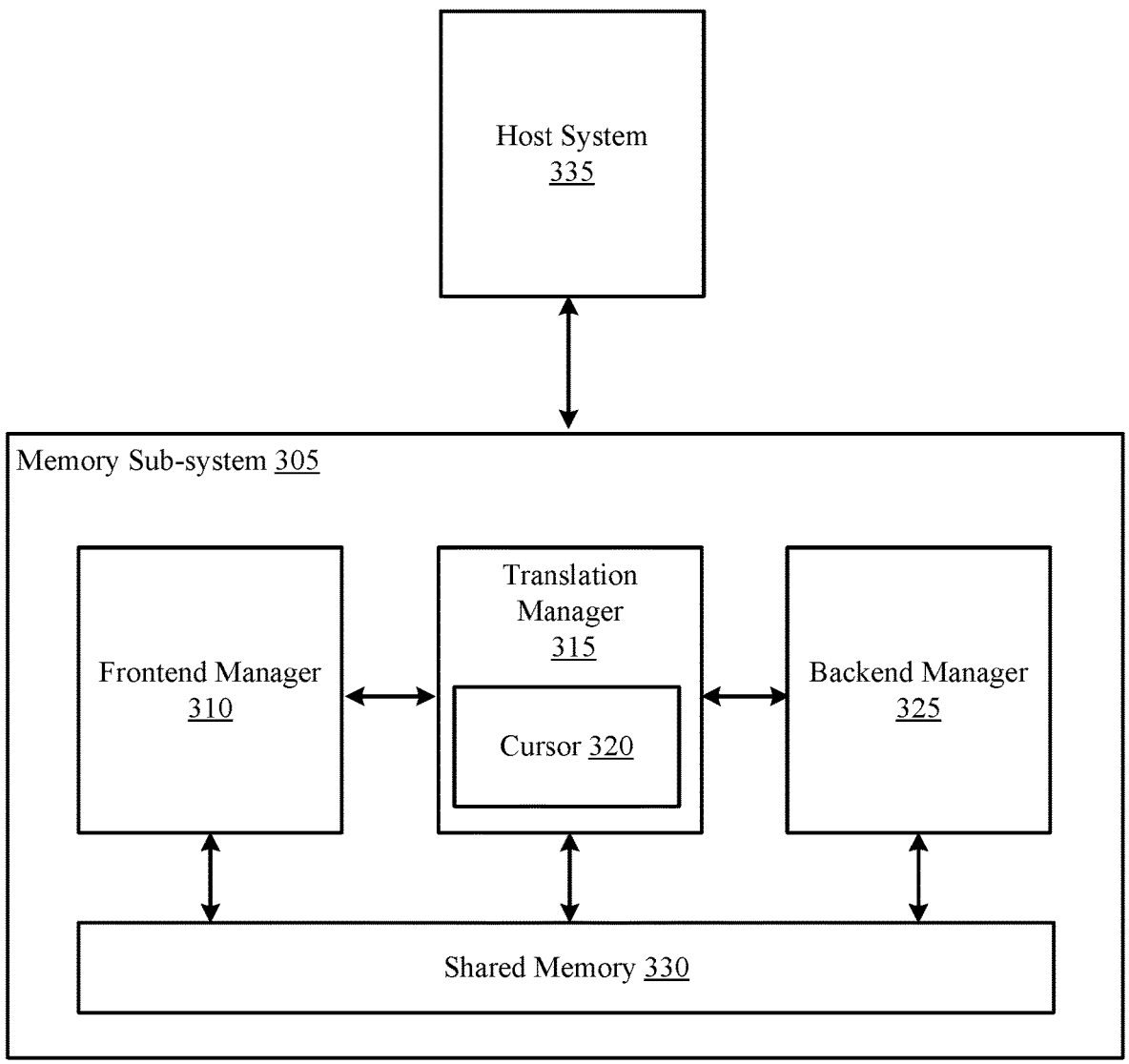
FIG. 3 is a block diagram of an example system that supports command batching for a memory sub-system in accordance with some examples of the present disclosure.

FIG. 3 is a block diagram 300 of an example system that supports command batching for a memory sub-system in accordance with some examples of the present disclosure. The block diagram 300 can include memory sub-system 305. Memory sub-system 305 can include frontend manager 310, translation manager 315, backend manager 325, and shared memory 330. The translation manager 315 can include cursor 320. The block diagram 300 can also include host system 335.

The memory sub-system 305 can receive, from the host system 335, commands for transfer units of the memory sub-system 305. The cursor 320 can be used to abstract the data layout and write ordering of the media. For example, the cursor 320 can be between the frontend manager 310 which handles user data in transfer units and the backend manager 325. The cursor 320 can ensure that data is written in the range of NAND flash memory cells indicated in the command received from the host system 335. For example, a write process can be performed to write the transfer units to the memory device of the memory sub-system 305. The cursor 320 can also aggregate transfer units into groups for backend operations at the backend manager 325. Backend operations can include issuing a B-command to write data to the memory device of the memory sub-system 305 based on retrieving the transfer units and aggregating the transfer units into a group.

In some cases, the frontend manager 310 can generate a list of the transfer units. The list can include pointers between each of the transfer units. In such cases, the list can be an example of a linked list. For example, the pointer can be associated with the transfer unit and indicate the next transfer unit in the linked list of transfer units. Each transfer unit can comprise a corresponding pointer. The linked list of transfer units can enable the memory sub-system 305 to improve the overall efficiency of the memory sub-system 305 by operating on the transfer units with increased write speeds.

In some examples, the frontend manager 310 can submit the linked list to a write cursor (e.g., cursor 320). In such cases, the write cursor can packetize the information to be able to iterate on the linked list for multiple iterations. For example, the cursor 320 can retrieve a transfer unit in the linked list and then retrieve the next transfer unit in the linked list based on multiple iterations on the same linked list. The transfer units can be linked to each other regardless of a host command received from the host system 335. In such cases, the links between the transfer units in the linked list are independent of the host command.

The operations of the cursor 320 can change based on receiving an indication of the linked list. For example, the cursor 320 can receive a single call (e.g., single indicator) associated with the generation of the linked list. In such cases, the cursor 320 can receive the single call for several transfer units to be included in the link list. The transfer units can be retrieved from the linked list based on sending the single call for the first transfer unit included in the linked list. In traditional memory sub-systems, the cursor 320 can receive multiple calls for several transfer units, thereby increasing the processing times related to performing the write operation and decreasing the overall performance. By receiving a single call for several transfer units, the memory sub-system can decrease the processing times related to performing the write operation.

In some cases, a shared memory 330 can be shared more than one layer of the firmware (e.g., the frontend manager 310, the translation manager 315, and the backend manager 325). Each layer of the firmware can be implemented by one or more processing cores. In some embodiments, some processing cores can be dedicated to performing the functions of a specific layer. For example, a first set of cores (such as the I/O cores) can be dedicated to performing the functions of the frontend manager 310, a second set of cores (such as the FTL cores) can be dedicated to performing the functions of the translation manager 315, and/or a third set of cores can be dedicated to performing the functions of the backend manager 325. In some embodiments, one or more cores can perform functions associated with more than one layer of the firmware. The pointers of the linked list can be stored in a shared memory 330, where the pointer can indicate a next transfer unit in the linked list. In some cases, the transfer units and the linked list can be stored in the shared memory 330. In such cases, the various processing cores associated with each layer can access the pointer, the linked list, and the transfer units stored in the shared memory 330.

The frontend manager 310 can send, from the I/O core to a processing core, an indicator (e.g., a systag) of a first transfer unit of the linked list. The indicator can be an example of an internal data description and control blocks that can be used to pass user data information and the data between hardware and firmware components. The processing core configured to receive the indicator can be included in the translation manager 315 or the backend manager 325. The indicator can include a link to the first transfer unit stored in the shared memory. For example, the frontend manager 310 can send a single indicator that includes a link to the first transfer unit of the transfer units stored in the shared memory 330 from one processing core to a different processing core. When the backend manager 325 receives the indicator, the backend manager 325 can retrieve the transfer unit linked to the indicator. In some cases, the processing core that receives the indicator can request if the shared memory 330 includes a transfer unit linked to the indicator. If the shared memory 330 includes the transfer unit linked to the indicator, the transfer unit can be retrieved from the shared memory 330.

The transfer unit can be retrieved from the shared memory 330 based on sending the indicator of the first transfer unit and storing the pointer in the shared memory 330. In such cases, the indicator can be passed down into the cursor 320, thereby eliminating the need for the firmware to access and look at all the indicators. The cursor 320 can iterate on the indicator for multiple host commands received from the host system 335 regardless of the host command. Once the indicator to the first part of the linked list (e.g., first transfer unit) is received, the cursor 320 can retrieve the transfer unit from the shared memory 330 if the indicator is linked to the transfer unit. The next transfer unit can be retrieved based on the pointer of the first transfer unit indicating the next transfer unit. Thus, the indicator can be sent to the processing core to retrieve one or more transfer units from the shared memory 330 until all the transfer units are retrieved.

In such cases, the amount of signaling between the host system 335 and the memory sub-system 305 can be reduced by sending the indicator of the first transfer unit as opposed to the first transfer unit itself, thereby reducing the latency for future write operations. In such cases, the indicator can be a smaller message size than a message size of the first transfer unit, thereby reducing the message size transferred between the frontend manager 310 and the backend manager 325. In some examples, several messages transmitted between the processing cores can be reduced based on generating the linked list and sending the indicator of transfer unit. Reducing the number of messages transmitted between the processing cores can minimize an overhead of wasted cycles to move transfer units from the frontend manager 310 to the backend manager 325.

In some cases, the pointer can be retrieved from the shared memory 330 based on retrieving the first transfer unit. The pointer can identify the next transfer unit in the linked list that is stored in the shared memory 330. In such cases, the next transfer unit can be retrieved based on retrieving the pointer. In some examples, a next pointer can be retrieved from the shared memory 330. The next pointer can be associated with the next transfer unit and can identify a second next transfer unit in a chain of transfer units in the linked list. Thus, the second next transfer unit can be retrieved from the shared memory 330 based on retrieving the next pointer from the shared memory 330.

In some examples, the indicator can be added to an internal command (e.g., B-command) in the cursor 320. The internal command can include an indication to write data to a memory device of the memory sub-system 305. The transfer units in the linked list can be assigned to the internal command. In some examples, the cursor 320 assign several indicators to the pointer to retrieve the transfer units associated with the pointer from the shared memory 330, thereby allowing the cursor 320 to iterate on the internal command without interacting with the host system 335 for each command. In traditional memory sub-systems, the indicator can be retrieved from an external source (e.g., mailbox) and then transferred to the cursor 320, thereby increasing processing times related to performing the write operation. In some cases, the cursor 320 can determine that a field of the internal command is full (e.g., occupied). For example, the cursor 320 can determine that the field is full based on assigning the transfer units to the internal command. If the field of the internal command is full, the cursor 320 can send the internal command to the backend manager 325 (e.g., memory device).

Figure 4:
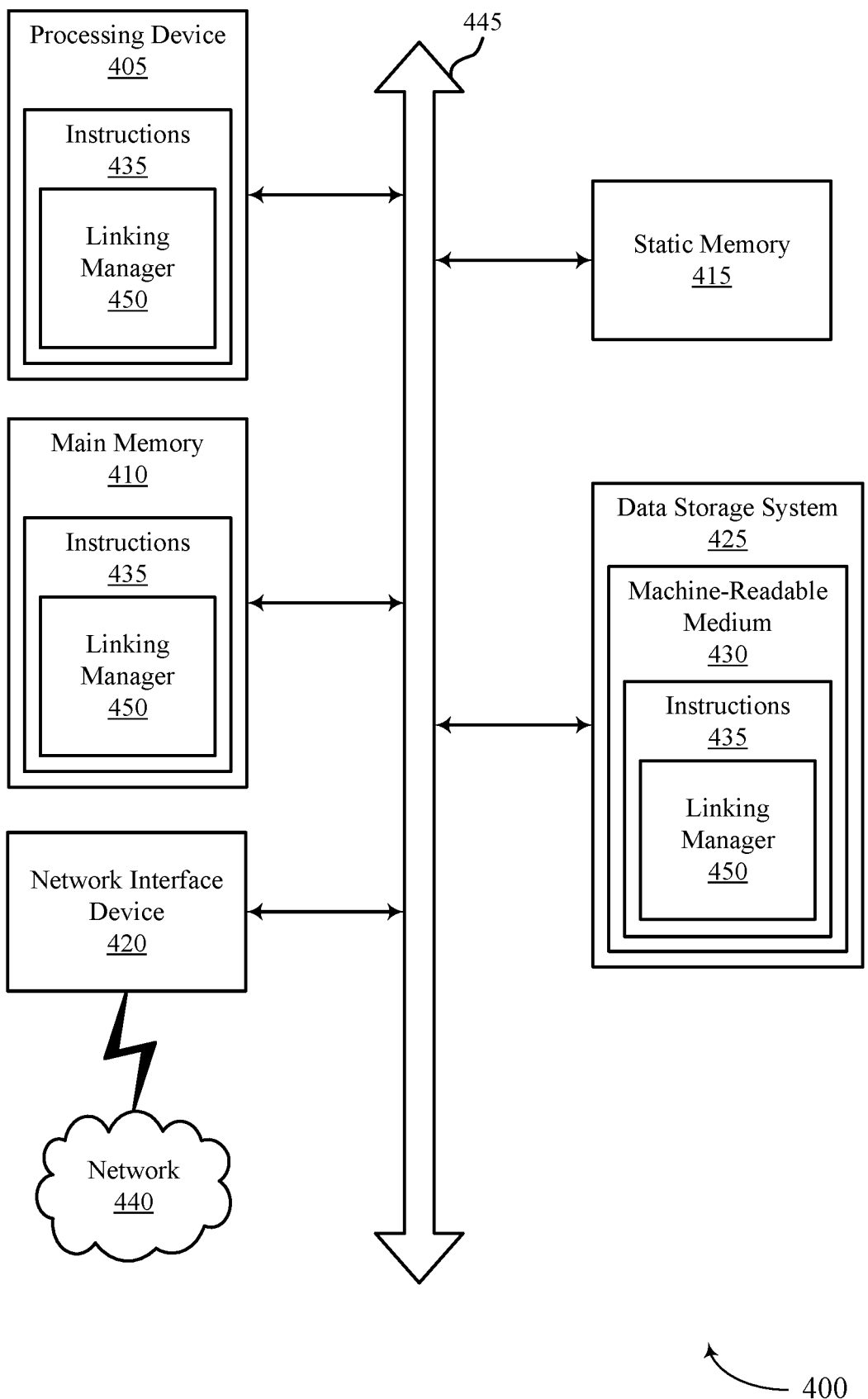
FIG. 4 is a block diagram of an example computer system that supports command batching for a memory sub-system in accordance with some examples of the present disclosure.

FIG. 4 is a block diagram of an example computer system that supports command batching for a memory sub-system in accordance with some examples of the present disclosure. The computer system 400 can include a set of instructions, for causing the machine to perform any one or more of the techniques described herein. In some examples, the computer system 400 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the linking manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 400 can include a processing device 405, a main memory 410 (e.g., ROM, flash memory, DRAM such as SDRAM or Rambus DRAM (RDRAM), etc.), a static memory 415 (e.g., flash memory, static RAM (SRAM), etc.), and a data storage system 425, which communicate with each other via a bus 445.

Processing device 405 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 405 can also be one or more special-purpose processing devices such as an ASIC, an FPGA, a DSP, network processor, or the like. The processing device 405 is configured to execute instructions 435 for performing the operations and steps discussed herein. The computer system 400 can further include a network interface device 420 to communicate over the network 440.

The data storage system 425 can include a machine-readable storage medium 430 (also known as a computer-readable medium) on which is stored one or more sets of instructions 435 or software embodying any one or more of the methodologies or functions described herein. The instructions 435 can also reside, completely or at least partially, within the main memory 410 and/or within the processing device 405 during execution thereof by the computer system 400, the main memory 410 and the processing device 405 also constituting machine-readable storage media. The machine-readable storage medium 430, data storage system 425, and/or main memory 410 can correspond to a memory sub-system.

In one example, the instructions 435 include instructions to implement functionality corresponding to a linking manager 450 (e.g., the linking manager 150 described with reference to FIG. 1). While the machine-readable storage medium 430 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method comprising:
receiving a plurality of commands for writing a plurality of transfer units of a memory sub-system to a non-volatile memory device, the plurality of transfer units each comprising a block of data to be written to the non-volatile memory device;
generating, at an input/output core, a list of the plurality of transfer units that includes pointers between the plurality of transfer units;
storing, by the input/output core, at least one pointer of the list in a shared memory that is shared by a plurality of cores, the at least one pointer indicating a next transfer unit of the list;
sending, from the input/output core to a processing core, an indicator of a first transfer unit of the list based at least in part on storing the at least one pointer in the shared memory; and
retrieving, from the shared memory and by the processing core, the plurality of transfer units that each comprise the block of data to be written to the non-volatile memory device based at least in part on sending the indicator of the first transfer unit and storing the at least one pointer in the shared memory.

2. The method of claim 1, wherein retrieving the plurality of transfer units further comprises:
retrieving the first transfer unit from the shared memory based at least in part on sending the indicator;
retrieving the at least one pointer from the shared memory based at least in part on retrieving the first transfer unit from the shared memory; and
retrieving the next transfer unit from the shared memory based at least in part on retrieving the at least one pointer.

3. The method of claim 2, further comprising:
retrieving a second pointer from the shared memory based at least in part on retrieving the next transfer unit from the shared memory; and
identifying a second next transfer unit based at least in part on the second pointer.

4. The method of claim 1, further comprising:
storing, in the shared memory of the memory sub-system, the plurality of transfer units based at least in part on receiving the plurality of commands.

5. The method of claim 1, wherein retrieving the plurality of transfer units is based at least in part on sending a single indicator of the first transfer unit of the plurality of transfer units, wherein the indicator comprises the single indicator.

6. The method of claim 1, further comprising:
identifying that a second pointer associated with a second transfer unit of the plurality of transfer units is stored in the shared memory based at least in part on retrieving the plurality of transfer units from the shared memory.

7. The method of claim 6, further comprising:
retrieving, from the shared memory, the second transfer unit based at least in part on identifying that the second pointer is stored in the shared memory.

8. The method of claim 1, further comprising:
assigning the plurality of transfer units in the list to at least one internal command to write data to the non-volatile memory device of the memory sub-system based at least in part on retrieving the plurality of transfer units, wherein the non-volatile memory device is different from the shared memory.

9. The method of claim 8, further comprising:
determining that a plurality of fields of the at least one internal command are occupied based at least in part on assigning the plurality of transfer units to the at least one internal command.

10. The method of claim 9, further comprising:
sending, to the non-volatile memory device, the at least one internal command based at least in part on determining that the plurality of fields of the at least one internal command are occupied.

11. The method of claim 1, wherein links between the plurality of transfer units in the list are independent of a host command.

12. The method of claim 1, further comprising:
performing a write process to write the plurality of transfer units to the non-volatile memory device of the memory sub-system based at least in part on retrieving the plurality of transfer units from the shared memory.

13. A system comprising:
a plurality of memory devices; and
a processing device, operatively coupled with the plurality of memory devices, to:
receive a plurality of commands for writing a plurality of transfer units of a memory sub-system to at least one non-volatile memory device of the plurality of memory devices, the plurality of transfer units each comprising a block of data to be written to the at least one non-volatile memory device;
generate, at an input/output core, a list of the plurality of transfer units that includes pointers between the plurality of transfer units;
store, by the input/output core, at least one pointer of the list in a shared memory that is shared by a plurality of cores, the at least one pointer indicating a next transfer unit of the list;
send, from the input/output core to a processing core, an indicator of a first transfer unit of the list based at least in part on storing the at least one pointer in the shared memory; and
retrieve, from the shared memory and by the processing core, the plurality of transfer units that each comprise the block of data to be written to the at least one non-volatile memory device based at least in part on sending the indicator of the first transfer unit and storing the at least one pointer in the shared memory.

14. The system of claim 13, further comprising:
the processing device to:
retrieve the first transfer unit from the shared memory based at least in part on sending the indicator;
retrieve the at least one pointer from the shared memory based at least in part on retrieving the first transfer unit from the shared memory; and
retrieve the next transfer unit from the shared memory based at least in part on retrieving the at least one pointer.

15. The system of claim 14, further comprising:
the processing device to:
retrieve a second pointer from the shared memory based at least in part on retrieving the next transfer unit from the shared memory; and
identify a second next transfer unit based at least in part on the second pointer.

16. The system of claim 13, further comprising:
the processing device to:
store, in the shared memory of the memory sub-system, the plurality of transfer units based at least in part on receiving the plurality of commands.

17. The system of claim 13, further comprising:
the processing device to:
retrieve, from the shared memory, a second transfer unit based at least in part on identifying that a second pointer is stored in the shared memory.

18. A non-transitory computer-readable storage medium comprising instructions that, when executed by a processing device, cause the processing device to:
receive a plurality of commands for writing a plurality of transfer units of a memory sub-system to a non-volatile memory device, the plurality of transfer units each comprising a block of data to be written to the non-volatile memory device;
generate, at an input/output core, a list of the plurality of transfer units that includes pointers between the plurality of transfer units;
store, by the input/output core, at least one pointer of the list in a shared memory that is shared by a plurality of cores, the at least one pointer indicating a next transfer unit of the list
send, from the input/output core to a processing core, an indicator of a first transfer unit of the list based at least in part on storing the at least one pointer in the shared memory; and
retrieve, from the shared memory and by the processing core, the plurality of transfer units that each comprise the block of data to be written to the non-volatile memory device based at least in part on sending the indicator of the first transfer unit and storing the at least one pointer in the shared memory.

19. The non-transitory computer-readable storage medium of claim 18, wherein the processing device is further to:
retrieve the first transfer unit from the shared memory based at least in part on sending the indicator;
retrieve the at least one pointer from the shared memory based at least in part on retrieving the first transfer unit from the shared memory; and
retrieve the next transfer unit from the shared memory based at least in part on retrieving the at least one pointer.

20. The non-transitory computer-readable storage medium of claim 19, wherein the processing device is further to:
retrieve a second pointer from the shared memory based at least in part on retrieving the next transfer unit from the shared memory; and
identify a second next transfer unit based at least in part on the second pointer.

* * * * *